United States Patent Office 3,209,082
Patented Sept. 28, 1965

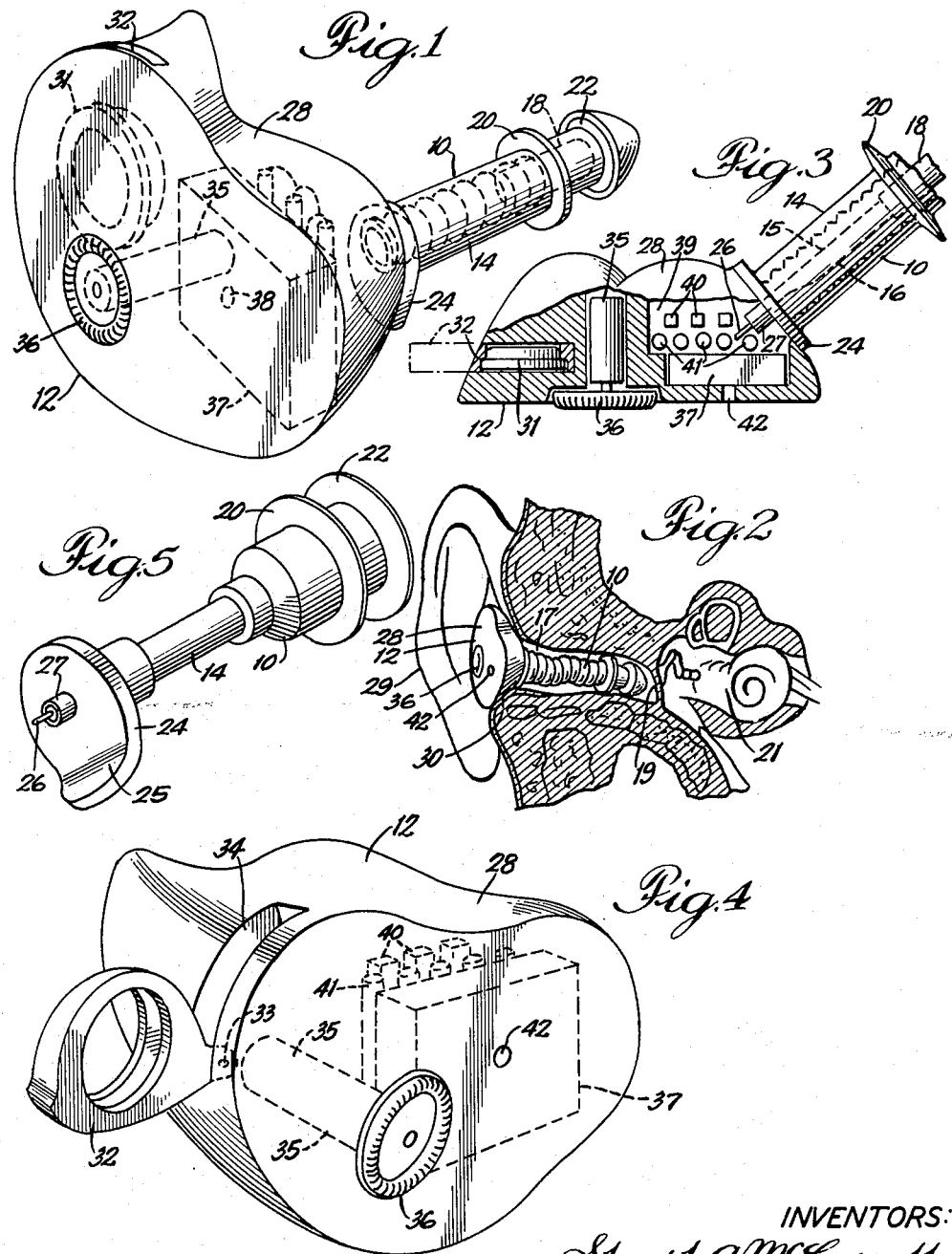

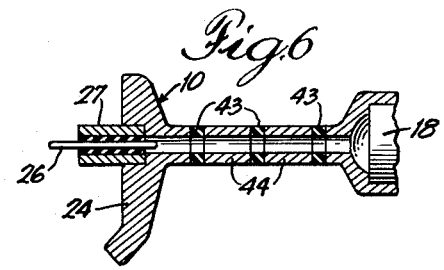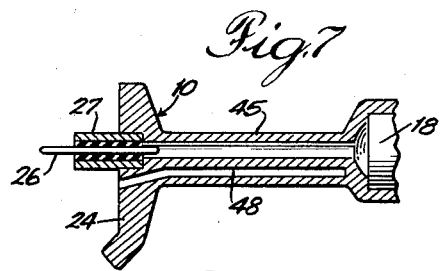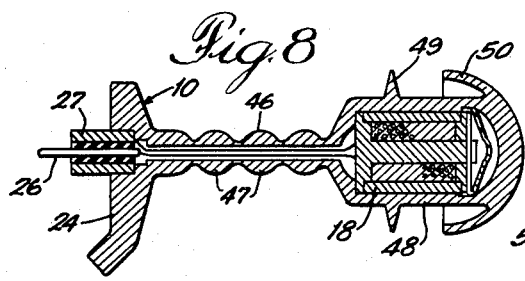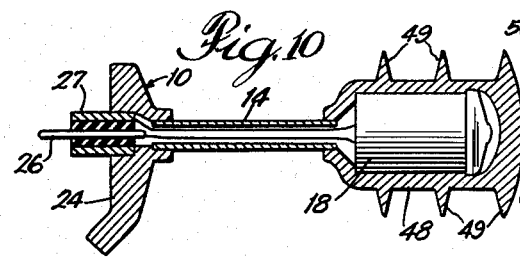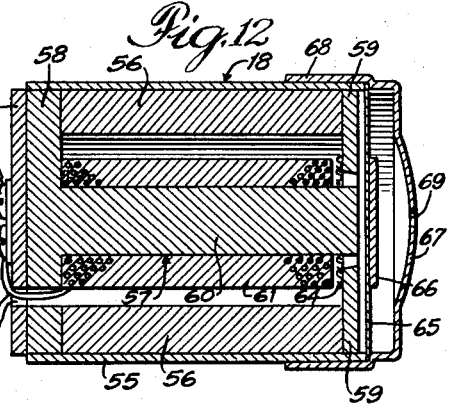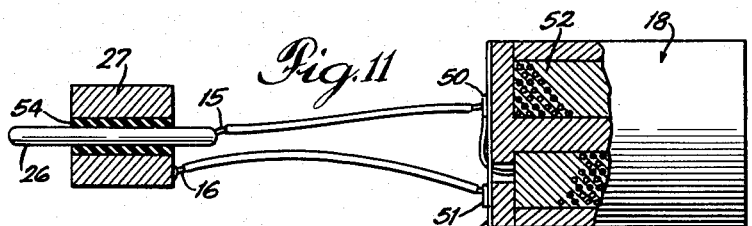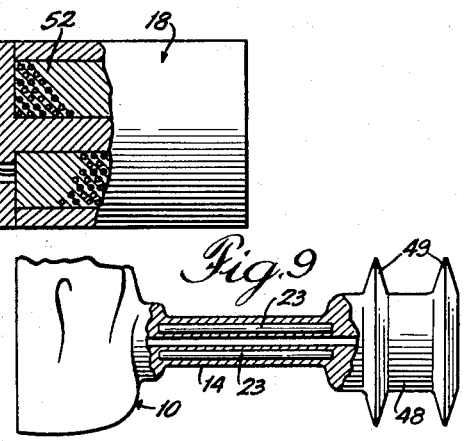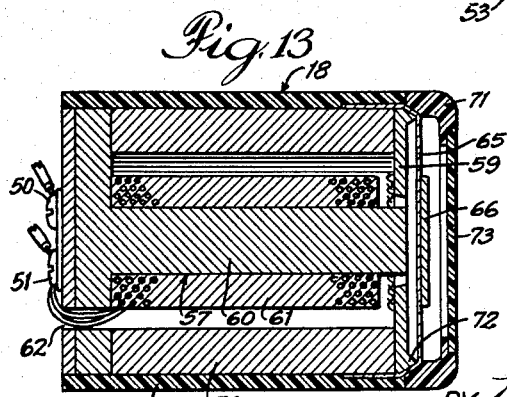

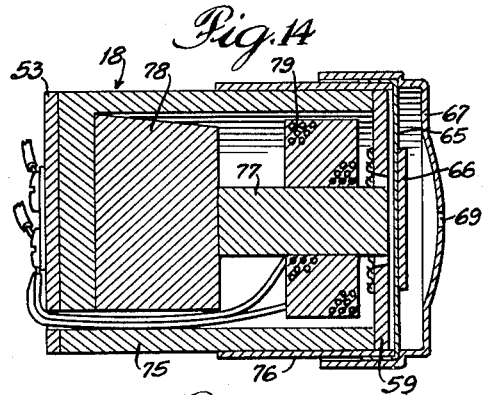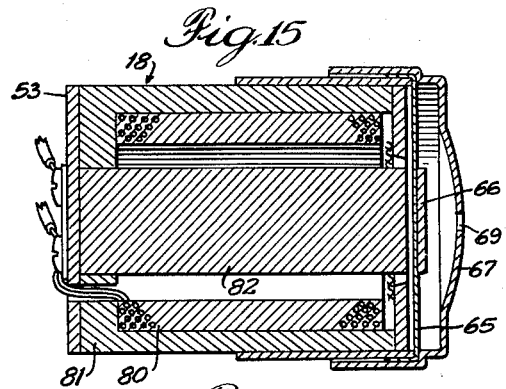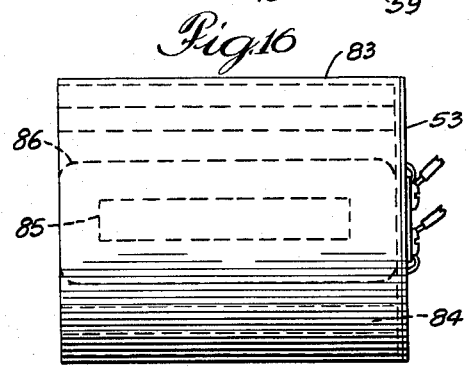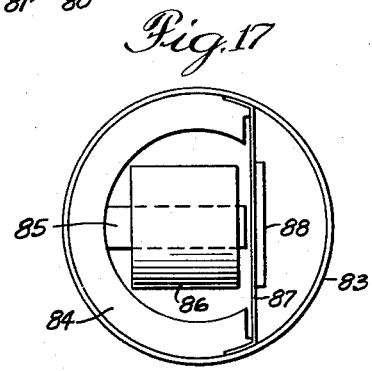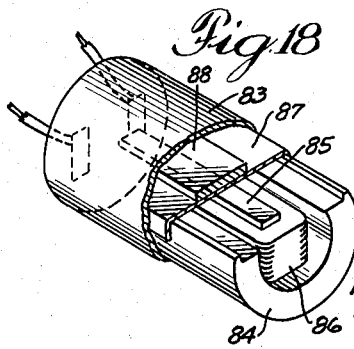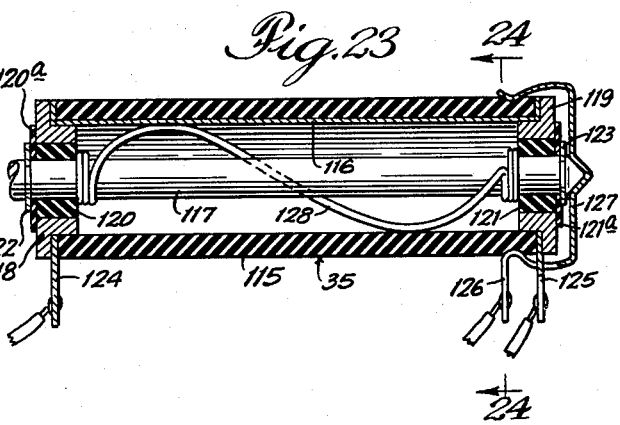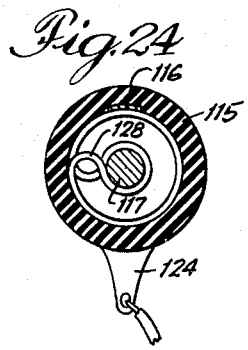

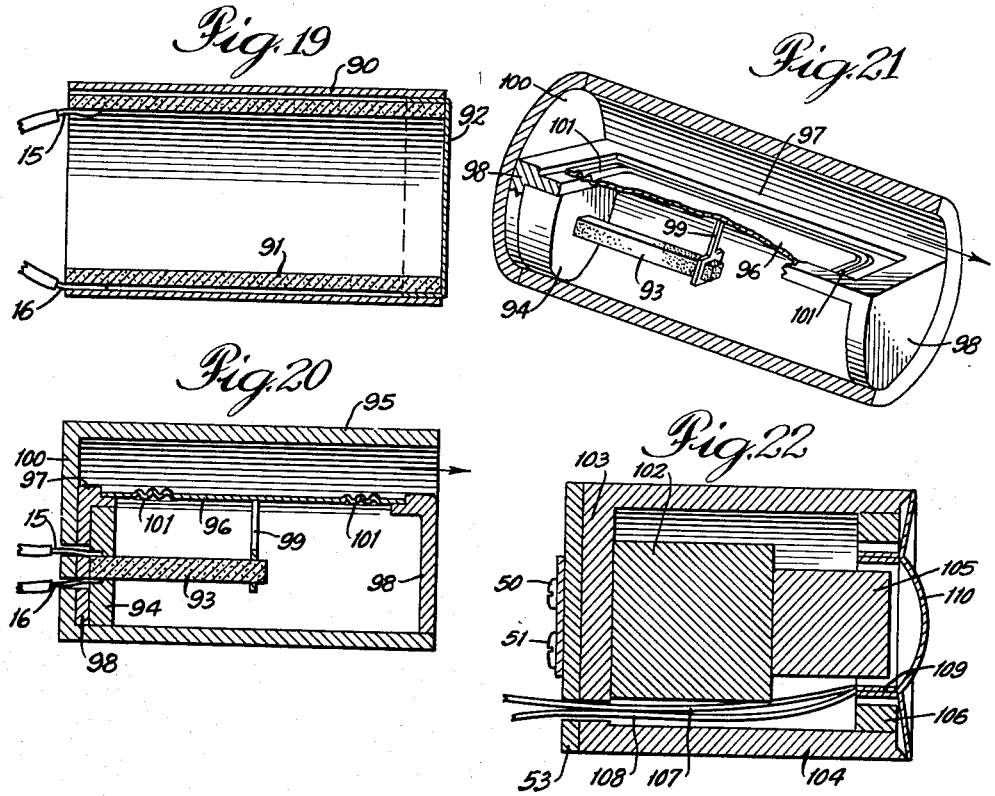

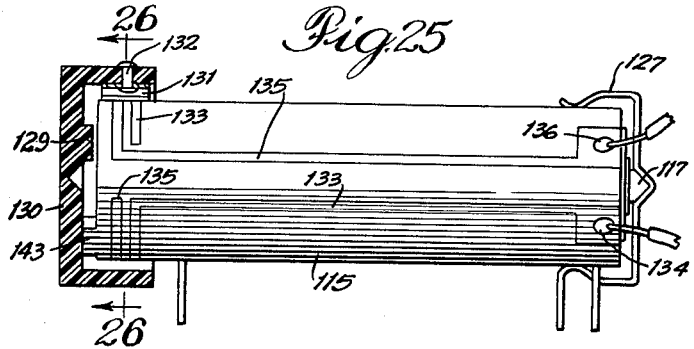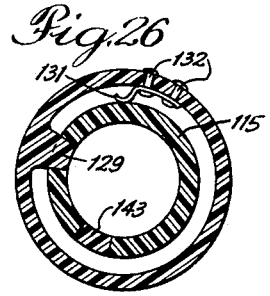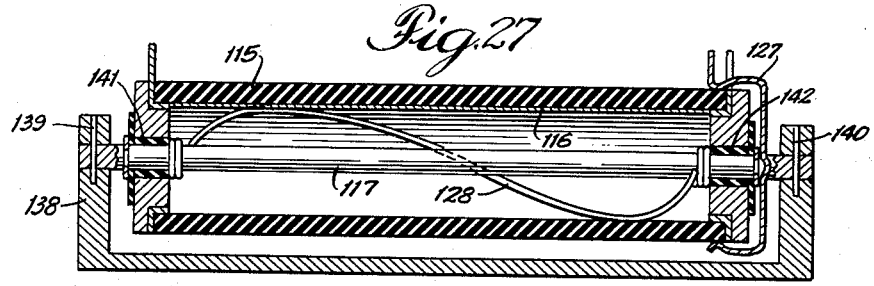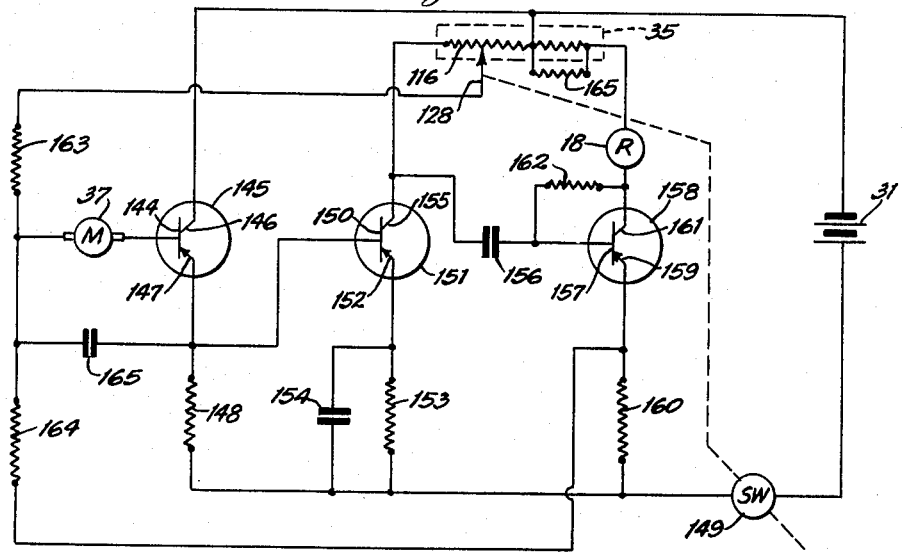

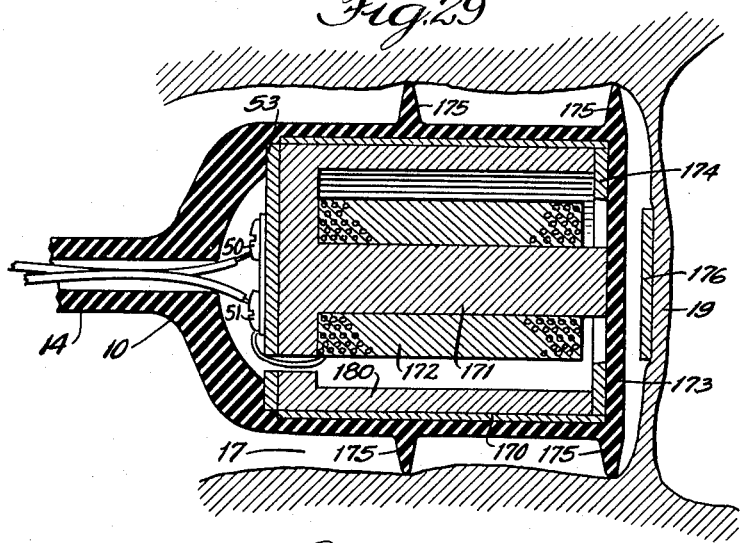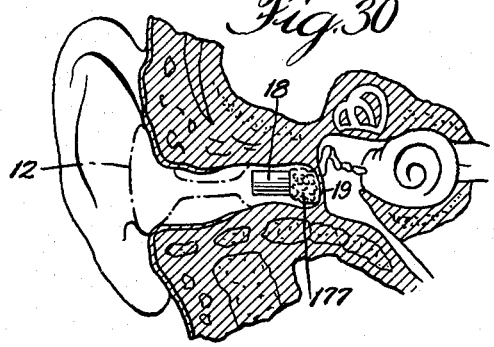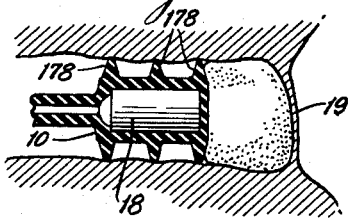
INVENTORS:
Stuart G. McCarrell
and Harry A. Wayne,
BY Bair, Freeman & Molinare
ATTORNEYS.

3,209,082
HEARING AID
Stuart G. McCarrell, Chicago, and Harry A. Wayne, Skokie, Ill., assignors to Beltone Electronics Corporation, a corporation of Illinois
Original application May 27, 1957, Ser. No. 661,628, now Patent No. 3,061,689, dated Oct. 30, 1962. Divided and this application Aug. 16, 1962, Ser. No. 198,694
1 Claim. (Cl. 179—107)

This invention relates generally to hearing aids and more particularly to new and improved constructions for compact hearing aids which are adapted to be completely contained in the external ear. This application is a division of our co-pending application, Serial No. 661,628, filed May 27, 1957, now Patent 3,061,689.

It is a general object of this invention to provide an improved hearing aid assembly in which all of the component parts are completely contained in a composite unitary structure adapted to be worn in the external ear of the user.

It is another object of this invention to provide such a hearing aid assembly in which the microphone and receiver are positioned relatively close to each other, thus enabling the assembly to be reduced in size, but which are acoustically isolated from each other for enabling maximum available power and gain to be used with freedom from acoustical and vibratory feedback.

It is still another object of this invention to provide a hearing aid assembly having a receiver of unique construction which is adapted to be operatively positioned within the ear canal closely adjacent the ear drum of the user.

It is a further object of this invention to provide sealing means around the receiver within the ear canal for isolating the receiver from the microphone to substantially eliminate acoustical and vibratory feedback therebetween.

It is a still further object of this invention to provide a novel resilient coupling member for coupling the receiver within the ear canal to the remainder of the hearing aid wherein the resilient coupling member is constructed with sufficient stiffness to facilitate the insertion of the receiver within the ear canal, yet with sufficient flexibility to fit the contour of the ear canal, especially during movement thereof as during talking, chewing and the like.

It is a still further object of this invention to provide a novel resilient coupling member, as described above, which serves not only to support the receiver in non-contacting relation with the ear canal but in addition serves to isolate the microphone from mechanical vibration of the receiver to the end that such mechanical vibration is not fed back to the microphone.

Still another object of this invention is the provision of a compact, self-contained hearing aid assembly which is adapted to be contained within the external ear of the user and which, in an advantageous embodiment thereof, comprises a resilient coupling member adapted to fit within the ear canal for supporting a receiver closely adjacent the ear drum, and a front end control portion containing a microphone, amplifier, volume control, and battery, detachably coupled to the resilient coupling member and adapted to be mounted in the concha of the ear so as to be substantially concealed from view.

It is still another object of this invention to provide a suitable ear mold formed of a resilient material, such as plastic, rubber or the like, which is adapted to enclose and support the front end control portion of the hearing aid assembly and which further is adapted to be shaped as desired to fit into the ear of the user.

It is a still further object of this invention to provide a hearing aid assembly which comprises a subminiature volume potentiometer having a unique and advantageous construction.

A still further object of this invention is the provision of a new and compact hearing aid assembly adapted to be fitted within the ear, as described above, and which comprises a compact yet high gain multi-stage amplifier circuit.

It is still another object of this invention to provide a new and improved self-contained hearing aid assembly which is characterized by its unusually small size, its high sensitivity, and its freedom from acoustical and vibratory feedback.

These and other objects are realized in accordance with a specific illustrative embodiment of this invention which comprises a subminiature receiver of unique construction adapted to be fitted deep into the ear canal adjacent the ear drum, a resilient coupling member housing the receiver and serving to isolate the front end of the hearing aid assembly from mechanical vibratory feedback from the receiver, sealing means around the coupling member for providing an air-tight seal for the receiver to prevent acoustical feedback therefrom to the microphone, a core supporting the microphone, amplifier, volume control and battery of the hearing aid assembly, and an ear mold of firm or resilient material adapted for encasing the core and further adapted to be shaped for fitting the concha of the ear to the end that substantially the entire hearing aid assembly is concealed from view within the ear of the user.

In accordance with a feature of the invention, a preferred embodiment of the subminiature receiver comprises an annular non-magnetic outer sleeve which carries therewithin an annular magnet, a centrally positioned center pole having a coil comprising a large number of turns of fine wire wound therearound, an annular disc-shaped pole piece adjacent one end of the magnet and having a central aperture through which one end of the center pole extends in closely adjacent relation to the pole piece, a special plastic diaphragm supporting a metal slug spaced from the pole piece and center pole for movement relative thereto in response to the energization of the coil, and a non-magnetic cap positioned over the diaphragm and adapted to maintain the latter in proper operating position, the cap being provided with a centrally located hole having an inductance which cooperates with the trapped air between the diaphragm and the cap to provide a desired acoustical response of the receiver.

In accordance with another feature of this invention, the spacing between the metal slug on the plastic diaphragm and the magnetic poles may be adjusted as desired to utilize maximum magnetic flux in the receiver. Advantageously, the metal slug and the plastic diaphragm are constrained between the outer sleeve and the cap, and the receiver core and magnet assembly are magnetically adjusted relative thereto for maximum sound output and desired audio quality from the receiver. It will be appreciated by those skilled in the art that the unique construction of the receiver, as described above, enables the receiver output to be adjusted as desired without lowering the strength of the magnet itself in accordance with conventional prior art practices.

In accordance with another illustrative embodiment of the invention, the receiver core and magnet assembly is encased in a plastic holding sleeve and the plastic diaphragm is held in position adjacent the magnetic poles by means of a plastic cap fitted over the edges of the diaphragm. Advantageously, a loose plastic protective cover is provided at the central portion of the plastic cap to prevent dirt, wax and other foreign elements from entering the receiver.

In accordance with further features of this invention, additional embodiments of subminiature receivers adapted to be fitted within the ear canal are provided including a receiver having the coil concentrated at the gap end of the core which utilizes the leakage flux by causing it to be circulated at the gap, a receiver having its magnet centrally disposed therein with its coil wound adjacent the pole pieces at the inner surface of the outer sleeve, and a receiver having its diaphragm longitudinally disposed within the outer sleeve and extending substantially the length thereof.

Still further features of this invention include subminiature receivers for use within the ear canal which comprise a receiver of the piezo-electric type having a crystal transducer, such as barium titanate, and a diaphragm positioned in an outer sleeve, as described above, and a dynamic receiver having a moving coil fastened to the diaphragm and positioned between opposite pole pieces within the outer sleeve.

Acoustical feedback from the receiver within the ear canal to the microphone is prevented in accordance with a feature of this invention by means of a plurality of thin sealing members spaced along the outer surface of the receiver housing. These thin sealing members engage the inner wall of the ear canal to provide an air-tight seal between the receiver output and the front end control portion of the hearing aid assembly. The isolation attained by this novel arrangement effectively resolves the problem of acoustical feedback which normally would be present due to the close proximity of the microphone and receiver and thereby makes possible the use of maximum attainable gain from the amplifier of the hearing aid. It will be appreciated that the increased sensitivity thus permitted together with the increased sensitivity provided by placing the receiver within the ear canal adjacent the ear drum represent a significant advance in the hearing aid art.

The resilient coupling member which connects the receiver to the front end control portion of the hearing aid advantageously is in the form of a hollow tube through which the conductors for energizing the receiver are positioned. In accordance with the invention, the longitudinal rigidity of the coupling member is sufficient to permit the receiver to be inserted within the ear canal without permitting undue vibratory feedback from the receiver. Further, the resilient coupling member is constructed with sufficient flexibility to follow the contour of the ear canal while the latter is both at rest and in motion as during talking, eating and the like.

The resilient coupling member advantageously is detachably coupled to the compact high gain amplifier circuit which in accordance with a feature of this invention comprises a multi-stage transistor circuit having both positive and negative feedback characteristics and, further, which is characterized by the elimination of audio coupling transformers. A volume control potentiometer of novel construction is included in the amplifier circuit, and in accordance with a feature of this invention, the volume control potentiometer comprises a subminiature barrel of insulating material having a resistance strip provided along the inner surface thereof, and a helical contact wire, movable with respect to the barrel and adapted to contact the resistance strip at a different single point for each operative position of the barrel and contact wire.

It is a further feature of this invention that the microphone, amplifier, volume control potentiometer and battery which comprises the front end control portion of the hearing aid assembly be mounted in a suitable mold of plastic, rubber or the like, which is shaped to fit the concha of the ear of the user. Advantageously, the battery is mounted in a recessed hinged holder which is adapted to be pulled out of the ear mold for facilitating the insertion and replacement of the battery therein.

The above and other features of novelty which characterize the invention are pointed out with particularity in the claim annexed to and forming a part of this specification. For a better understanding of the invention, and its advantages, reference is had to the accompanying drawing and descriptive matter in which is shown and described several illustrative embodiments of the invention.

In the drawing:

FIGURE 1 is a perspective view of a hearing aid assembly embodying principles of the invention;

FIGURE 2 is a drawing illustrating the embodiment of FIGURE 1 in operative position within the external ear of the user;

FIGURE 3 is a plan view in cross section of the front end control portion of the hearing aid assembly;

FIGURE 4 is a perspective view of the front end control portion of the hearing aid assembly illustrating one embodiment of a recessed battery holder;

FIGURE 5 is a perspective view of one illustrative form of resilient coupling member embodying the invention;

FIGURES 6 through 10 are cross sectional views of several illustrative resilient coupling members in accordance with the invention;

FIGURE 11 is a view, partly in cross section, illustrating the construction of the coupling element electrical contact assembly;

FIGURES 12 through 22 are views illustrating the construction of several subminiature receivers embodying principles of the invention;

FIGURES 23 through 27 are views illustrating the construction of several subminiature volume control potentiometers in accordance with the invention;

FIGURE 28 is a schematic diagram of a multi-stage transistor amplifier circuit in accordance with the invention;

FIGURE 29 is a cross sectional view of a directly coupled embodiment of subminiature receiver;

FIGURES 30 and 31 are views illustrating a hydraulically coupled embodiment of the receiver in accordance with the invention; and FIGURE 32 is an enlarged partial view of the plastic diaphragm assembly utilized in certain embodiments of the invention showing the diaphragm construction in greater detail.

Referring now to the drawing and more particularly to FIGURES 1 through 5 thereof, there is shown a specific illustrative embodiment of hearing aid assembly embodying the invention which comprises a receiver portion 10 adapted to be inserted within the ear canal of the user and a front end control portion 12 adapted for operative connection to the receiver portion 10 and further adapted to be fitted into the concha of the ear of the user. Advantageously, receiver portion 10 comprises an elongated tubular housing 14 through which conductors 15 and 16 extend and having a subminiature receiver 18 mounted at one end thereof.

In accordance with an aspect of this invention, tubular housing 14 is formed of a resilient and flexible material, such as rubber or plastic, to the end that the receiver portion 10 is made to follow the contours of the ear canal 17 when the receiver portion 10 is operatively positioned therein as shown in FIGURE 2. Further, as explained in greater detail hereinbelow, tubular housing 14 is formed with sufficient longitudinal rigidity to facilitate the insertion of the end containing the subminiature receiver 18 into operative position within the ear canal adjacent the ear drum 19.

It will be appreciated by those skilled in the art that in prior art hearing aids in which the receiver was mounted near the microphone serious problems arose as a result of the acoustical or vibratory feedback therebetween. Thus, it often became necessary in the prior art to reduce the gain of the amplifier used in the hearing aid to minimize such acoustical feedback. The construction of the present invention enables the use of a full gain amplifier despite the close proximity between the receiver 18 and the microphone 37 due to the positioning of the receiver 18 within the ear canal and to the provision of acoustical sealing members 20 and 22 extending outwardly from tubular housing 14 into engagement with the walls of the ear canal. Sealing members 20 and 22, which are formed from a suitably resilient material, serve not only to provide an air tight chamber for the receiver, but in addition serve to compensate for variations in diameter of the ear canals of the various users of the invention.

The front end control portion 12 of the hearing aid assembly advantageously is housed in an ear mold or assembly 28 which preferably is formed of a suitable material, such as plastic or rubber, and is adapted to be seated into the concha 30 of the ear of the user. Ear mold 28 has positioned therein a source of power for the hearing aid in the form of a subminiature battery 21 which in one embodiment of the invention is positioned in a recessed holder 32. To facilitate the removal and replacement of battery 31, holder 32 is pivoted, such as at pivot 33, so as to be fitted into a slot 34 provided in the mold 28 when the battery is in position and to be pulled out from the mold 28 during removal or replacement of the battery.

Ear mold or assembly 28 also has positioned therein a microphone 37 which is mounted so that its pick-up opening 38 is in alignment with a suitable opening 42 at the front of ear mold 28. An amplifier 39 is positioned adjacent microphone 37 and in accordance with the preferred embodiment of the invention, as described in detail below, amplifier 39 is a multi-stage amplifier circuit comprising suitably connected transistors 40 and resistance and capacitance elements 41.

The amplifier circuit also is provided with a volume control and on-off switch which advantageously may be in the form of a subminiature potentiometer 35 having a manually operable control knob 36 extending therefrom into manually accessible position outside the ear mold 48. It is a feature of this invention that the amplifier, microphone, volume control and battery may be assembled on a flexible form which is inserted into a special ear mold, or alternatively, the ear mold may be formed around this package to provide a custom fit.

The receiver portion 10 and the front end control portion 12 of the hearing aid assembly are made detachable from each other to permit custom fitting of the ear mold 28 to the ear of the user as well as to facilitate maintenance and repair of the front end control portion. In accordance with a feature of this invention, the subminiature receiver 18 is electrically connected to the amplifier 39 by means of conductors 15 and 16 which terminate in the coaxial connectors 27 and 26 adapted to plug into the amplifier when the receiver portion 10 and front end control portion 12 are operatively connected.

This connection is facilitated by means of an eccentric flange 24 having a finger grip 25 provided at one end of a tubular housing 14 of the receiver portion 10. It can be seen, as for example from FIGURES 1, 2 and 3, that when receiver portion 10 and front end control portion 12 are connected together, the rearward portion of the ear mold 28 is seated against the eccentric flange 24 to provide an effective connection therebetween.

In accordance with features of this invention, the tubular housing 14 may take several forms. The criterion which must be met, however, is that the tubular housing 14 have sufficient rigidity in the longitudinal direction to permit the subminiature receiver 18 at one end of the housing to be readily inserted into the ear canal closely adjacent the ear drum plus sufficient flexibility in the transverse direction to permit the tubular housing 14 to follow the contours of the ear canal both when the canal is in its static condition and while it is in motion such as during talking, chewing, and the like.

Accordingly, there is shown in FIGURE 6 a preferred construction of tubular housing having a vertebrate joint construction in which a plurality of wafers 43 of a relatively soft material such as foam rubber are provided at spaced intervals along the housing body 44. Since the housing body is formed of a stiffer and less resilient material, such as hard rubber or plastic, it will be appreciated that this construction enables flexible bending of the housing to be obtained with a maximum longitudinal rigidity and also a minimum longitudinal sound conduction.

The tubular housing embodiment shown in FIGURES 7 and 7A comprises a body 45 of a relatively soft material which serves to substantially lessen unwanted conduction transmission in a longitudinal direction along the housing from the receiver 18 to the front end control portion. The use of the soft material for the housing body 45 is enabled by the semi-flexible rod or stiffener 46 shown in FIGURE 7A. Thus to insert the receiver portion within the ear canal, flexible rod 46 is positioned by means of the finger grip 47 within the molded hole 48 provided therefor in the housing body 45. During the insertion operation, semi-flexible rod 46 adds sufficient longitudinal rigidity to the tubular housing to enable the latter to be properly placed within the ear canal without buckling as would be the case if the rod 46 were not used. Manifestly, after the tubular housing is in place within the ear canal, the semi-flexible rod 46 may be removed to reduce unwanted conduction therethrough as well as to gain the transverse flexibility inherently obtainable from the soft material comprising the housing body 45.

A further preferred construction for the tubular housing of the receiver portion 10 is shown in FIGURE 8 wherein the tubular housing 46 takes the form of a connecting tube having a beaded shape. Thus, the connecting tube is formed of a resilient material having a plurality of beaded portions 47 spaced along the length thereof to provide the longitudinal rigidity and transverse flexibility required, as described above.

In the illustrative tubular housing embodiment shown in FIGURE 9, the housing 14 is provided with an elongated annular hollow portion 23 intermediate the outer surface of the housing body and the central conductor tube. In accordance with an aspect of the invention, hollow portion 23 is filled with a wax, gelatinous material or any suitable thermoplastic material that will become more pliable with heat. Thus, the fill material in hollow portion 23 offers sufficient rigidity during insertion of the receiver portion 10 into the ear canal and with the subsequent loosening of the fill material due to body heat, the tubular housing 14 becomes flexible, as desired. Manifestly, other constructions for the tubular housing 14 equivalent to the constructions shown in FIGURES 6, 7, 8 and 9 may be utilized in accordance with the invention provided the necessary combination of longitudinal rigidity and transverse flexibility are present.

Referring back to FIGURE 8, there is illustrated one way in which the subminiature receiver 18 may be mounted within the tubular housing 46 of the receiver portion 10. Thus, the tubular housing body 46 is enlarged at one end for receiving and completely enclosing the subminiature receiver 18. Advantageously, the enlarged portion 48 of the tubular housing 46 is provided with a circular fin or acoustical sealing member 49 extending outwardly around the enlarged portion 48 for providing an air tight seal in the ear canal to prevent acoustical feedback from the receiver 18 to the microphone 37 in front control portion 12. An additional sealing member 50 is provided at the end of the enlarged portion 48 of tubular housing 46 to further reduce the acoustical feedback and to provide a cushion for the subminiature receiver 18 within the ear canal to the end that the inner surface of the ear canal as well as the ear drum is cushioned from the receiver.

It will be appreciated by those skilled in the art that in accordance with the principles of this invention, a plurality of circular fins or sealing members may be provided in spaced relation along the enlarged portion 48 of the tubular housing surrounding the receiver 18 as shown in FIGURES 9 and 10. In addition, the receiver portion 10 may be constructed in the form of a single integrally constructed tubular housing and eccentric flange as shown in FIGURES 8 and 9 or in the form of a composite unitary connection such as the three element construction of FIGURE 10. Thus, it can be seen in FIGURE 10 that the eccentric flange 24 is individually formed and is connected to the one end of the tubular housing 14. The other end of the tubular housing 14 is connected to a separately constructed receiver housing 48. Other equivalent constructions for the tubular housing 14 are fully within the spirit and scope of this invention.

The manner in which the receiver 18 is connected to the coaxial connector contacts 26 and 27 is shown in detail in FIGURE 11 of the drawing. Thus, in accordance with a specific illustrative embodiment of the invention, the terminals 50 and 51 for the coil 52 of the receiver 18 are connected by means of conductors 15 and 16 respectively to the coaxial connector contacts 26 and 27. Advantageously, coil terminals 50 and 51 are formed on a printed circuit disc 53 secured to the end of the receiver housing. Coil terminal 50 is connected by conductor 15 to the coaxial conductor 26 and coil terminal 51 is connected by conductor 26 to the coaxial conductor sleeve 27. A suitable insulating sleeve 54 is provided between the contacts 26 and 27.

A preferred embodiment of receiver 18 is shown in FIGURE 12 of the drawing. Advantageously, this receiver comprises a housing or outer sleeve 55 of a non-magnetic material, such as non-magnetic stainless steel, which has positioned therewithin an annular magnet 56 having a center pole 57 secured at one end thereof. The base 58 of center pole 57 is sandwiched between the one pole of magnet 56 and the printed circuit disc 53, which as explained above, has conductor terminals 50 and 51 secured thereto. The opposite pole of magnet 56 has a disc shaped annular pole piece 59 secured thereto and the central elongated portion 60 of center pole 57 extends into the aperture defined at the center of annular pole piece 59.

A coil 61, which advantageously comprises a large number of turns of relatively fine wire, is wound around the central portion 60 of central pole 57 in operative association therewith and the ends of coil 61 are connected to the printed circuit disc terminals 50 and 51. Suitable openings 62 are provided at the base portion 58 of center pole 57 and in the printed circuit disc 53 for enabling the coil ends to be connected to their terminals. If desired, suitable damping means such as damping member 64 may be provided around the central portion 60 of center pole 57 adjacent the pole piece 59.

In accordance with an important aspect of this invention, the subminiature receiver 18 is provided with a special plastic diaphragm 65 described in detail below. A metallic slug 66 is secured to the plastic diaphragm 65 with a suitable adhesive and is positioned relative to the pole piece 57 so as to be responsive to the energization of the latter by coil 61. A cap 67 of a non-magnetic material, such as non-magnetic stainless steel, is formed with an enlarged flange portion 68 to the end that when the cap 67 is fitted in proper position over the receiver outer sleeve 55, the flange portion 68 of cap 67 cooperates with the outer sleeve 55 to hold the plastic diaphragm 65 tightly stretched over the center pole 60 and pole piece 59.

Advantageously, the receiver 18 may be assembled by placing a plastic disc 65 with the slug 66 attached thereto over the end of outer sleeve 55. Cap 67 then is pressed over the plastic disc 65 until the shoulder of the flange portion 68 of cap 67 is properly seated against the outer edge of outer sleeve 55.

In accordance with a feature of this invention, the position of slug 66 relative to magnet 56 may be mechanically adjusted to utilize maximum magnetic flux without requiring the magnet to be knocked down. Thus, the plastic diaphragm 65 is held tightly stretched over magnet 57 by cap 67, as described above, and the magnet and coil assembly is adjusted relative to plastic diaphragm 65 and metal slug 66 from the other end of outer sleeve 55 until the desired spacing is attained. It will be appreciated by those skilled in the art that this desired spacing may be attained by adjusting the magnet and coil assembly within the outer sleeve for a maximum sound output and desired audio quality from the receiver. After this adjustment is completed, the positions of the magnet and coil assembly, and of the cap relative to the outer sleeve may be fixed by any suitable means such as an adhesive.

The cap 67 is provided with a central aperture 69 which is of a diameter such that the trapped air within the receiver 18 and the inductance of aperture 69 provides maximum acoustical response. It now is understood that the receiver 18, despite its extremely small parameters, is adapted to provide effective transmission of audio signals to the ear drum.

The size of the subminiature receiver 18 may be appreciated in that in an illustrative embodiment constructed in accordance with the above description, the overall length was .230 inch, the overall diameter was .200 inch and the spacing between the pole piece and the spacing between the magnetic coils and the plastic diaphragm was adjusted a distance of .010 inch. It further will be understood that the use of the plastic diaphragm 65 in a subminiature receiver enables the attainment of satisfactory acoustical response in a receiver having such relatively small dimensions.

In accordance with a preferred construction of the subminiature receiver 18, the plastic diaphragm is formed in the manner shown in FIGURE 32. As depicted therein, the diaphragm 65 comprises two layers of plastic film 180 and 181, respectively, which are held together by a layer of suitable adhesive 182, sandwiched between layers 180 and 181.

In an illustrative plastic diaphragm constructed as shown in FIGURE 32, the plastic film layers 180 and 181 advantageously were formed of mylar and the film layer 181 was coated with vaporized aluminum coating 183 to add additional stiffness to the diaphragm. It will be appreciated by those skilled in the art that other constructions and materials for the plastic diaphragm 65 may be utilized with desirable results in lieu of the illustrative construction shown in FIGURE 32 and that the use of such alternative forms are within the spirit of the invention.

Another illustrative embodiment of subminiature receiver 18, as shown in FIGURE 13 of the drawing, comprises an outer sleeve 70, advantageously formed of a plastic material, which has mounted therewithin an annular magnet 56 having a center pole 60 and a pole piece 59, and a coil 61 wound around the center pole 60 in the manner described above. A plastic diaphragm 65 having a metallic slug 66 positioned thereon is held tightly stretched over magnet 57 by means of a plastic cap 71 seated against the plastic outer sleeve 70 to the end that the plastic diaphragm 65 is held between the plastic sleeve 70 and cap 71, and the magnetic pole piece 59. Advantageously, pole piece 59 may have a raised portion 72 extending therearound adapted to cooperate with the inner edge of the plastic cap 71.

In accordance with a feature of this embodiment, plastic cap 71 is provided with a suitably dimensioned central opening across which is positioned a loose plastic protective cover 73. Protective cover 73 serves to keep foreign elements such as dirt, wax, etc. from entering the receiver 18 and at the same time permits effective sound transmission therethrough to the ear drum.

In a further illustrative embodiment of subminiature receiver 18, as shown in FIGURE 14 the annular magnetic pole piece 75 serves as the outer sleeve of the receiver. A non-magnetic sleeve 76 is positioned over a portion of pole piece 75 and a non-magnetic cap 67 is seated over sleeve 76 to the end that the plastic diaphragm 65, upon which metallic slug 66 is affixed, is held tightly stretched over the magnet center pole 77. In this embodiment of receiver 18, the magnet 78 is concentrated at one end of the receiver cavity and the coil 79, to which the audio signals are applied from the hearing aid amplifier, is wound in concentrated form over the central pole 77 at the other end of the receiver cavity. The construction shown in FIGURE 14 has the advantage of utilizing the leakage flux. It will be appreciated by those skilled in the art that the utilization of leakage flux in this manner serves to increase the magnetic flux variations in the gap and thus increase the receiver efficiency.

Another illustrative embodiment of receiver 18 is shown in FIGURE 15 of the drawing. This embodiment is similar in some respects to the subminiature receiver embodiment shown in FIGURE 12 with the exception that the coil of wire 80 for receiving the audio signals from the amplifier is wound in the form of an annular coil adjacent the inner surface of the shell 81 of the receiver. This is in contrast to the construction of FIGURE 12 in which the coil 61 is wound around the center pole 60. Thus, in the embodiment of FIGURE 15, the magnet 82 may be formed with relatively greater cross section and further may extend from the printed circuit disc 53 to a position closely spaced from the plastic diaphragm 65. The sub-miniature receiver shown in FIGURE 15 has the advantage in being simpler and cheaper to build than the constructions of the other illustrative embodiments described above.

Still another illustrative embodiment of subminiature receiver is shown in FIGURES 16, 17, and 18 of the drawing. In this construction the non-magnetic outer sleeve 83 has positioned therewithin an elongated U-shaped magnet 84 which extends substantially the entire length of the receiver. An elongated center pole 85 and coil 86 are positioned in the U-shaped magnet 84 and also extend substantially the length of the receiver. A plastic diaphragm 87 and metal slug 88 positioned thereon are placed over the U-shaped magnet 84 and held tightly stretched thereacross in closely spaced relation to center pole 85 by means of the outer sleeve 83. It will be appreciated that this construction enables the area of the diaphragm to be considerably enlarged over the diaphragm areas of the receiver constructions described heretofore. One end of the outer sleeve 83 is sealed as by means of the printed circuit disc 53 and the sound pressure, which is considerably greater due to the greatly enlarged area, is transmitted to the ear drum from the other end of the receiver.

In the illustrative receiver embodiment shown in FIGURE 19 of the drawing, the outer tube or sleeve 90 has positioned therewithin a tube 91 of ceramic material which advantageously may be barium titanate. A diaphragm 92 is positioned between ceramic tube 91 and the outer sleeve 90, and is stretched across one end of the outer sleeve 90 to seal the latter by the gripping effect of the outer sleeve in cooperation with the ceramic tube 91. Conductors 15 and 16 from the amplifier in the front end control portion of the hearing aid assembly are connected to opposite surfaces of the ceramic tube 91 for causing the latter to vibrate diaphragm 92 in accordance with the audio signals.

If desired, substantially greater output may be obtained by the use of the ceramic receiver construction shown in FIGURES 20 and 21. In this illustrative embodiment, a bar 93 of ceramic material, which advantageously may also be barium titanate, is mounted on a support member 94 so as to extend longitudinally within the outer sleeve 95. A diaphragm 96 is mounted in a rectangular frame 97 supported by a pair of transverse end members 98 so as to also extend along the length of the receiver. Diaphragm 96 is operatively connected to the ceramic bar 93 by means of a linking connector 99, and the audio signal conductors 15 and 16 are connected to opposite surfaces of the ceramic bar 93 to the end that ceramic bar 93 responds to the signals to cause diaphragm 96 to vibrate at a frequency corresponding to the frequency of the signals.

One end of the receiver outer sleeve 95 is sealed by a wall 100 and the other end of the receiver is provided with a suitable opening through which the sound pressure resulting from vibration of diaphragm 96 is transmitted. The vibratory action of diaphragm 96 is facilitated in accordance with an aspect of this invention by means of the peripheral corrugations 101 provided at the marginal portions of the diaphragm adjacent the rectangular frame 97.

In a still further illustrative embodiment of subminiature receiver which may be utilized in the hearing aid assembly of the invention, as shown in FIGURE 22, one pole of a magnet 102 is affixed to the end wall 103 of a magnetic shell 104. A center pole 105 is secured to the other pole of magnet 102 and an annular pole piece 106 is secured to the shell 104 in spaced relation with center pole 105 so as to define a gap therebetween.

A printed circuit disc 53 is attached to the outer surface of end wall 103 and carries thereon a pair of terminals 50 and 51 to which conductors 15 and 16 from the amplifier of the hearing aid may be connected. Terminals 50 and 51 are connected by means of conductors 107 and 108 to an annular moving coil 109 positioned in the annular gap defined by pole piece 106 and center pole 105. Moving coil 109 is held in position in the gap and is enabled to vibrate longitudinally thereof in response to audio signals by means of a resilient diaphragm 110 secured at its edges to the outer edges of shell 104. Thus, it will be appreciated that the subminiature receiver of the invention may take the form of a moving coil type of a dynamic receiver as well as the magnetic and ceramic forms described above.

The volume control potentiometer 35 mounted within the ear mold 28 advantageously may be constructed as shown in FIGURES 23 and 24 of the drawing. As shown therein, the potentiometer 35 comprises a cylindrical barrel 115 formed of an insulating material and having a strip of resistance material 116 positioned along the inner surface thereof and extending substantially the entire length of the barrel 115. A shaft 117 is rotatably mounted in a pair of metal bushings 118 and 119 respectively, at opposite ends of the barrel 115 and in electrical contact with resistance strip 116. Advantageously, suitable insulating members such as insulating rings 120 and 121 and insulating discs 120a and 121a are provided between metal bushings 118 and 119 and shaft 117, and the shaft 117 is held in position within the barrel by means of the C-rings 122 and 123. One resistance strip terminal 124 is provided between bushing 118 and barrel 115, and the other resistance strip terminal 125 is provided between bushing 119 and barrel 115. The wiper terminal 126 for the potentiometer is connected to a metal clip member 127 which is in electrical contact with one end of the shaft 117.

In accordance with the invention, the potentiometer wiper comprises a helical contact wire 128 which is positioned around shaft 117 and which is connected at one end thereof to the shaft adjacent the bushing 120 and at the other end thereof to the shaft adjacent the bushing 121. The diameter of helical contact wire 128 is such that the wire engages the resistance strip 116 at one point thereof for each position of the shaft 117 relative to the barrel 115. Thus, in the operation of the potentiometer 35, the output resistance may be varied as desired in a relatively simple manner by rotation of the shaft 117 within barrel 115. Manifestly, a manually operable control knob 126, as shown in FIGURES 1 through 4 for example, may be connected to shaft 117.

If desired, the volume control potentiometer 35 may be provided with suitable on-off contacts by means of the construction shown in FIGURES 25 and 26. Thus, the control knob 130 secured to the potentiometer shaft 117 may be substantially cup-shaped to the end that a suitable brush contact 131 may be secured to the inner surface thereof, as by means of the rivets 132 extend through the wall of knob 130. The outer surface of barrel 115 has a suitable on-off circuit printed thereon in the form of the conductor 133 extending around barrel 115 and connected to terminal 134, and conductor 135 extending around barrel 115 and connected to terminal 136. It can be seen that the rotation of knob 130 with respect to barrel 115 enables the circuit between terminals 134 and 136 to be opened and closed, as desired, to energize the hearing aid assembly from the battery 31. Advantageously, the range of rotation of knob 130 may be defined by a pair of cooperating limit stops 129 and 143, provided on knob 130 and barrel 115, respectively.

In an alternative construction for the hearing aid potentiometer, as shown in FIGURE 27, the shaft 117 is fixed to a suitable support 138, as by means of pins 139 and 140 at opposite ends of shaft 117, and the barrel 115 is made rotatable with respect to the fixed shaft 117 to provide the desired sliding contact between helical contact wire 128 and the resistance strip 116 on barrel 115. In this embodiment, it will be appreciated that suitable bushings such as bushings 141 and 142, are provided for the rotatable barrel to facilitate rotation of the latter with respect to the fixed shaft 117.

Those skilled in the art will readily appreciate that the novel features described above with respect to FIGURES 23 through 27 enable the potentiometer to be constructed in a subminiature yet efficient manner suitable for the requirements of the compact hearing aid assembly described herein.

A specific illustrative circuit suitable for the hearing aid assembly of the invention is shown in FIGURE 28. In this preferred embodiment, a three stage high gain transistor amplifier is connected between the microphone 37 and the receiver 18. The use of a high gain amplifier for a hearing aid in which the microphone is positioned so near to the receiver is unique with this invention and is made possible by the positioning of the receiver within the ear canal adjacent the ear drum together wtih the sealing fins surrounding the receiver to prevent acoustical feedback by the receiver to the microphone, as described in detail hereinabove.

In the amplifier circuit shown in FIGURE 28, one microphone terminal is connected to the base electrode 144 of transistor 145, the collector electrode 146 of which is connected to the negative terminal of battery 31. The emitter electrode 147 of transistor 145 is connected through a resistance 148 and the on-off switch 149 to the positive terminal of battery 31. Emitter electrode 147 of transistor 145 also is connected to the base electrode 150 of transistor 151.

The emitter electrode 152 of transistor 151 is connected through the parallel combination of resistance 153 and capacitance 154, and switch 149 to the positive terminal of battery 31. The collector electrode 155 of transistor 151 is connected through a capacitance 156 to the base electrode 157 of transistor 158. Emitter electrode 159 of transistor 158 is connected through a resistance 160 and switch 149 to the positive terminal of battery 31. The collector electrode 161 of transistor 158 is connected through a resistance 162 to the base electrode 157 and to a terminal of the receiver 18.

The resistance strip 116 of the volume control potentiometer 35 is connected between the other terminal of receiver 18 and the connector electrode 155 of transistor 151. The helical contact wire 128 of potentiometer 35 is connected through a resistance 163 to the other terminal of microphone 37.

It can be seen that the on-off switch 149 and the helical contact wire 128 of the potentiometer 35 are mechanically coupled, as described above, to the end that the electrical gain and output volume of the hearing aid assembly may be controlled by a single manually controlled knob. In accordance with an aspect of this invention, fidelity of reproduction is attained from the three stage transistor amplifier by means of a negative feedback resistance 164 connected between the emitter electrode 159 of transistor 158 and a terminal of microphone 37. Additionally, a capacitance 165 is connected between negative feedback resistance 164 and emitter electrode 147 of transistor 145. Further, a positive feedback resistance 165 is connected between a terminal of receiver 18 and a negative terminal of battery 31. The junction of positive feedback resistance 165 and the negative terminal of battery 31 also is connected to an intermediate point in the potentiometer resistance strip 116 and to the collector electrode 146 of transistor 145.

In accordance with a feature of this invention, both positive and negative feedback is provided in the three stage transistor amplifier circuit by feeding the signal output from the third transistor stage back to the input of the first transistor stage. Thus, the positive feedback is provided by feeding back from the output of transistor 158 an in-phase signal to the microphone input of transistor 145 and the negative feedback signal is provided by feeding back from the transistor 158 an out-of-phase signal to the microphone input of transistor 145. In accordance with this specific illustrative embodiment of the invention, the positive feedback signal is taken from the collector electrode 161 of transistor 158 at the receiver 18 and is applied through the positive feedback resistance 165 to the potentiometer resistance 116. The potentiometer wiper 128 serves to feed back this positive feedback signal to the microphone input of transistor 145 through the resistance 163. The negative feedback is provided by taking a negative feedback signal from the emitter electrode 159 of transistor 158—this emitter electrode signal being out of phase with the collector electrode signal—and applying this negative feedback signal to the microphone input of transistor 145 through the negative feedback resistance 164. Accordingly, it can be appreciated that the two out-of-phase signals obtained at the transistor 158 are fed back to the input of the amplifier to provide greater fidelity of reproduction.

It will be readily understood by those skilled in the art that, if desired, transistors of opposite P-N characteristics may be used in place of the transistors shown in FIGURE 28 by reversing the connections of the battery 31.

An illustrative embodiment of a directly coupled subminiature receiver is shown in FIGURE 29 of the drawing. In accordance with the invention, the directly coupled receiver comprises an outer shell 170, formed of a non-magnetic material, and having an annular magnet 180 with a center pole 171 positioned therewithin. A coil 172 is wound around the center pole 171 and the ends of the coil are connected to the terminals 50 and 51 secured to the printed circuit disc 53 in the manner described heretofore. The receiver is completely enclosed by a tubular housing 10 of resilient material having a front wall 173, advantageously formed of soft rubber or the like, adjacent the pole piece 174 and center pole 171 of the magnet 180. The tubular housing 10 is provided with suitable outwardly extending fins 175 which serve to form a sound seal and air trap to prevent acoustical feedback in the ear canal as described hereinabove.

It is a feature of this embodiment that the diaphragm responsive to the energization of coil 172 by the audio signals from the amplifier is located outside of the receiver housing proper in contrast to the constructions of the receivers described above. In this embodiment a magnetic slug 176 is affixed directly to the ear drum 19 to the end that the magnetic slug 176 and ear drum 19 are vibrated directly in accordance with the audio signals. It will be appreciated that as a result of this direct coupling between slug 176 and ear drum 19, greater efficiency and response can be attained from the receiver. It will be understood by those skilled in the art that to prevent possible injury to the ear drum, the magnetic slug may be plastic coated and secured to the ear drum by known adhesive materials which are not injurious to the ear drum.

A hydraulically coupled receiver embodiment is shown in FIGURES 30 and 31 of the drawing. It is known that the efficiency of sound transmission is much greater when the sound is transferred through a hydraulic medium than when the sound is transferred through an air medium inasmuch as the latter is compressible and the former is not. Thus, in accordance with the invention, the sound transmission is maximized from the subminiature receiver 18 by the provision of a hydraulic medium between the receiver 18 and the ear drum 19.

In FIGURE 30, there is shown a cotton wad 177 which advantageously may be saturated with a suitable liquid such as a boric acid ointment. Cotton wad 177 is positioned adjacent the receiver 18 and is placed in contact with the ear drum 19 to the end that sound transmission from the former is effectively communicated to the ear drum.

A further illustrative embodiment of a hydraulic coupled receiver is shown in FIGURE 31 in which the receiver 18 is provided with a tubular housing 10 having a plurality of sealing fins 178 extending therefrom into hermetically sealed contact with the walls of the ear canal. The space between the end of the receiver 18 and the ear drum 19 is filled with a suitable fluid, which advantageously may be a silicone liquid, such that the audio output of the receiver 18 is transmitted through the liquid in a highly efficient manner to the ear drum 19. It will be appreciated by those skilled in the art that various other means for providing hydraulic coupling between the receiver and the ear drum may be devised in accordance with the teachings of this invention.

It will be understood by those skilled in the art that changes may be made in the construction and arrangement of the parts of the illustrative embodiments of the hearing aid assembly disclosed herein without departing from the real spirit and scope of this invention and that it is intended to cover by the appended claim any modified forms of structures or use of equivalents which may reasonably be included within their scope.

What we claim as new and desire to secure by Letters Patent of the United States is:

A compact hearing aid assembly comprising a receiver adapted to be fitted within the ear canal and closely adjacent the ear drum of the user, a front end control portion adapted to be fitted into the concha of the ear, conductor means connecting said front end control portion to said receiver, and resilient coupling means for enclosing said conductor means and said receiver, said resilient coupling means comprising an elongated tubular member having a body of relatively stiff resilient material and a plurality of relatively soft resilient joints at spaced intervals along said body to enable flexible bending of said tubular member together with a desired longitudinal rigidity.

References Cited by the Examiner

UNITED STATES PATENTS

| | | | |
|---|---|---|---|
| 1,559,597 | 11/25 | Williams | 179—117 |
| 2,487,038 | 11/49 | Baum | 179—107 |
| 2,493,734 | 1/50 | Pearson | 179—114 |
| 2,754,373 | 7/56 | Shaper | 179—114 |
| 2,957,954 | 10/60 | Swinehart | 179—110 |
| 2,959,645 | 11/60 | Ladd | 179—107 |
| 2,967,913 | 1/61 | Aubert et al. | 179—107 |
| 2,975,389 | 3/61 | Karg | 338—176 |
| 2,987,584 | 6/61 | Webber et al. | 179—107 |
| 3,025,359 | 3/62 | Schilling et al. | 179—110 |
| 3,061,689 | 10/62 | McCarrell et al. | 179—107 |

ROBERT H. ROSE, *Primary Examiner.*

STEPHEN W. CAPELLI, *Examiner.*